United States Patent
Kobayashi et al.

(10) Patent No.: US 8,125,763 B2
(45) Date of Patent: Feb. 28, 2012

(54) MULTILAYER CERAMIC ELECTRONIC COMPONENT AND METHOD FOR MAKING THE SAME

(75) Inventors: Tatsunori Kobayashi, Echizen (JP); Akihiro Motoki, Fukui (JP); Makoto Ogawa, Fukui (JP); Toshiyuki Iwanaga, Sabae (JP); Shunsuke Takeuchi, Echizen (JP); Kenichi Kawasaki, Echizen (JP)

(73) Assignee: Murata Maunufacturing Co., Ltd., Kyoto (JP)

( * ) Notice: Subject to any disclaimer, the term of this patent is extended or adjusted under 35 U.S.C. 154(b) by 461 days.

(21) Appl. No.: 12/490,471

(22) Filed: Jun. 24, 2009

(65) Prior Publication Data
US 2009/0323253 A1    Dec. 31, 2009

(30) Foreign Application Priority Data

Jun. 25, 2008  (JP) ................................ 2008-165321
Apr. 7, 2009   (JP) ................................ 2009-092658

(51) Int. Cl.
*H01G 4/228* (2006.01)
*H01G 4/005* (2006.01)

(52) U.S. Cl. ..................... 361/309; 361/303; 361/306.3; 29/25.42

(58) Field of Classification Search ................ 361/303, 361/311, 306.1, 306.3, 309; 29/25.42
See application file for complete search history.

(56) References Cited

U.S. PATENT DOCUMENTS 6,381,118 B1 *  4/2002  Yokoyama et al. ........ 361/308.1
(Continued)

FOREIGN PATENT DOCUMENTS

JP    2004-327983 A    11/2004
(Continued)

OTHER PUBLICATIONS

Motoki et al., "Multilayer Electronic Component and Method for Manufacturing the Same", U.S. Appl. No. 12/110,484, filed Apr. 28, 2008.

(Continued)

*Primary Examiner* — Eric Thomas
(74) *Attorney, Agent, or Firm* — Keating & Bennett, LLP

(57) ABSTRACT

A multilayer ceramic electronic component includes external terminal electrodes that are formed by depositing metal plating films on exposed portions of internal conductors embedded in a ceramic body, depositing a copper plating films that cover the metal plating films and make contact with the ceramic body around the metal plating films, and heat-treating the ceramic body to generate a copper liquid phase, an oxygen liquid phase, and a copper solid phase between the copper plating films and the ceramic body. The mixed phase including these phases forms a region at which a copper oxide is present in a discontinuous manner inside the copper plating film at least at the interfaces between the ceramic body and the copper plating films. The copper oxide securely attaches the copper plating films to the ceramic body and enhances the bonding force of the external terminal electrodes.

8 Claims, 18 Drawing Sheets

U.S. PATENT DOCUMENTS

| | | |
|---|---|---|
| 6,960,366 B2 | 11/2005 | Ritter et al. |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |
| 7,177,137 B2 | 2/2007 | Ritter et al. |
| 7,344,981 B2 | 3/2008 | Ritter et al. |
| 7,345,868 B2 | 3/2008 | Trinh |
| 7,463,474 B2 | 12/2008 | Ritter et al. |
| 2003/0231457 A1 | 12/2003 | Ritter et al. |
| 2004/0022009 A1 | 2/2004 | Galvagni et al. |
| 2004/0066605 A1 | 4/2004 | Trinh |
| 2004/0090732 A1 | 5/2004 | Ritter et al. |
| 2004/0197973 A1 | 10/2004 | Ritter et al. |
| 2004/0218344 A1 | 11/2004 | Ritter et al. |
| 2004/0218373 A1 | 11/2004 | Ritter et al. |
| 2004/0257748 A1 | 12/2004 | Ritter et al. |
| 2004/0264105 A1 | 12/2004 | Galvagni et al. |
| 2005/0046536 A1 | 3/2005 | Ritter et al. |
| 2005/0146837 A1 | 7/2005 | Ritter et al. |
| 2007/0014075 A1 | 1/2007 | Ritter et al. |
| 2007/0133147 A1 | 6/2007 | Ritter et al. |
| 2008/0123248 A1 | 5/2008 | Kunishi et al. |
| 2008/0123249 A1 | 5/2008 | Kunishi et al. |
| 2008/0145551 A1 | 6/2008 | Kunishi et al. |
| 2008/0151470 A1 | 6/2008 | Motoki et al. |
| 2008/0158774 A1 | 7/2008 | Trinh |
| 2008/0210564 A1 | 9/2008 | Motoki et al. |
| 2008/0225462 A1 | 9/2008 | Motoki et al. |
| 2008/0239617 A1 | 10/2008 | Motoki et al. |
| 2009/0052114 A1 | 2/2009 | Motoki et al. |

FOREIGN PATENT DOCUMENTS

| | | |
|---|---|---|
| WO | 2007/049456 A1 | 5/2007 |

OTHER PUBLICATIONS

Motoki et al., "Multilayer Ceramic Electronic Component and Method for Manufacturing the Same", U.S. Appl. No. 12/110,484, filed Apr. 28, 2008.

Motoki et al., "Multilayer Ceramic Electronic Component and Method for Manufacturing the Same", U.S. Appl. No. 12/356,648, filed Jan. 21, 2009.

Iwanaga et al., "Monolithic Ceramic Electronic Component and Method for Manufacturing the Same", U.S. Appl. No. 12/405,370, filed Mar. 17, 2009.

Kayatani et al., "Multilayer Ceramic Electronic Component and Method for Making the Same", U.S. Appl. No. 12/469,799, filed May 21, 2009.

Iwanaga et al., "Multilayer Ceramic Electronic Component and Method for Producing Same", U.S. Appl. No. 12/405,372, filed Mar. 17, 2009.

Takeuchi et al., "Multilayer Ceramic Electronic Component and Manufacturing Method Thereof", U.S. Appl. No. 12/340,570, filed Dec. 19, 2008.

Nishihara et al., "Laminated Ceramic Electronic Component and Manufacturing Method Thereof", U.S. Appl. No. 12/617,879, filed Nov. 13, 2009.

Takeuchi et al., "Multilayer Electronic Component and Method for Manufacturing the Same", U.S. Appl. No. 12/817,352, filed Jun. 17, 2010.

Saruban et al., "Laminated Ceramic Electronic Component and Manufacturing Method Therefor", U.S. Appl. No. 12/821,305, filed Jun. 23, 2010.

* cited by examiner

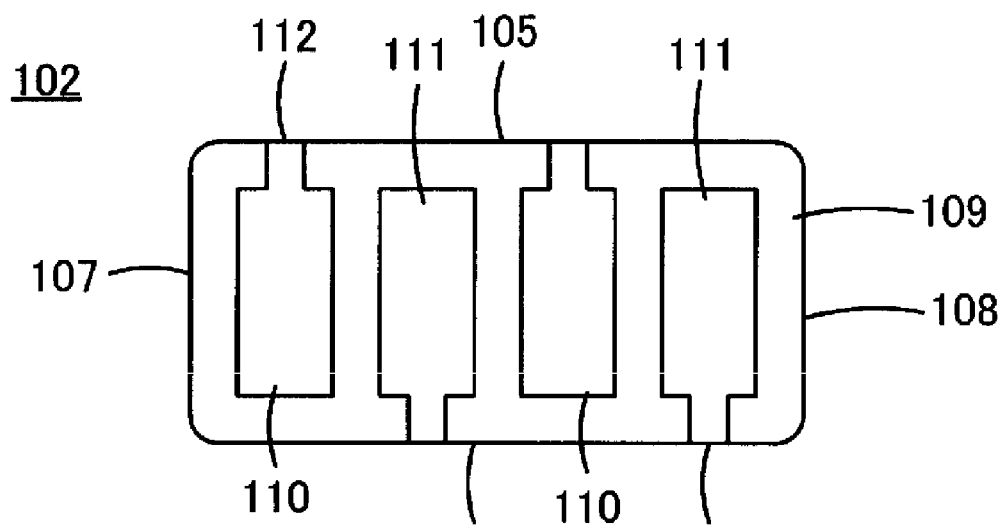
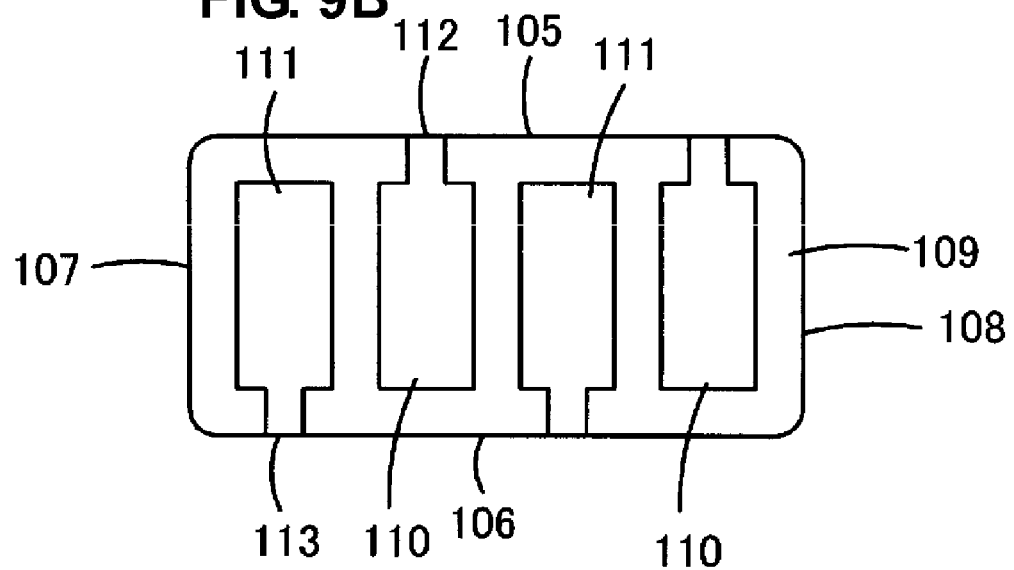

MULTILAYER CERAMIC ELECTRONIC COMPONENT AND METHOD FOR MAKING THE SAME

BACKGROUND OF THE INVENTION

1. Field of the Invention

The present invention relates to multilayer ceramic electronic components and methods for making the multilayer ceramic electronic components. In particular, the present invention relates to the structure of an external terminal electrode of a multilayer ceramic electronic component and a method for forming the external terminal electrode.

2. Description of the Related Art

In recent years, markets for small portable electronic appliances such as cellular phones, laptop computers, digital cameras, digital audio devices, etc., have expanded. These portable electronic appliances are achieving not only size reduction but also higher performance. Since a large number of multilayer ceramic electronic components are mounted on portable electronic appliances, multilayer ceramic electronic components are also required to achieve size reduction and higher performance. For example, multilayer ceramic capacitors are required to achieve size reduction and a higher capacitance.

In order to reduce the size of multilayer ceramic capacitors and increase their capacitance, it is effective to reduce the thickness of ceramic layers. Recently, capacitors having ceramic layers with a thickness of about 3 μm or less have been used in practical applications. Although further thickness reduction is currently being pursued, a problem arises in that short-circuits between internal conductors are more likely to occur with the thickness reduction of ceramic layers, thereby making it difficult to ensure the quality of the capacitors.

Another effective way is to increase the effective areas of internal conductors. However, for mass production of multilayer ceramic capacitors, side margins between the internal conductors and the side surfaces of the ceramic bodies and end margins between the internal conductors and the end surfaces of the ceramic bodies must be maintained in order to compensate for misalignment of stacked ceramic green sheets and cutting deviations. Thus, the amount by which the effective areas of the internal conductors can be increased is limited.

In order to increase the effective areas of internal conductors while maintaining sufficient margins, the areas of the ceramic layers must be increased. However, the amount by which the areas of the ceramic layers can be increased is limited due to designated size standards. Furthermore, the thickness of the external terminal electrodes is also a limiting factor.

Typically, external terminal electrodes of multilayer ceramic capacitors are formed by baking conductive paste that is applied on end portions of ceramic bodies. A common method for applying the conductive paste is to dip end portions of ceramic bodies in conductive paste disposed in a paste vessel. According to this method, the thickness of the conductive paste applied at the center portion of each end surface of the ceramic bodies tends to be greater than that of other portions due to the viscosity of the conductive paste. Thus, because the external terminal electrodes have thick portions (e.g., portions having a thickness exceeding about 30 μm), the areas of the ceramic layers must be decreased.

To overcome such a problem, a method for forming external terminal electrodes directly by plating has been proposed (e.g., see International Publication No. 2007/049456).

According to this method, plating films are deposited on exposed portions (nuclei) of internal conductors exposed at end surfaces of ceramic bodies, and the exposed portions of adjacent internal conductors become connected to each other as the plating films grow. Thin, flat electrode films can be formed with this method as compared to the existing method that uses conductive paste.

However, according to this plating method, the glass-bonding effect that is achieved by the existing method using the conductive paste is not obtained. Thus, the bonding force of the plating films, e.g., external terminal electrodes, to the ceramic bodies is relatively weak.

SUMMARY OF THE INVENTION

To overcome the problems described above, preferred embodiments of the present invention provide a multilayer ceramic electronic component including a thin external terminal electrode that has good bonding forces to the ceramic body, and a method for making the multilayer ceramic electronic component.

A preferred embodiment of the present invention provides a multilayer ceramic electronic component that includes a ceramic body including a plurality of stacked ceramic layers, the ceramic body having a first main surface and a second main surface that faces the first main surface and a plurality of side surfaces that connect the first main surface to the second main surface, an internal conductor disposed in the ceramic body and having an exposed portion exposed at least one of the side surfaces of the ceramic body, and an external terminal electrode disposed on at least one of the side surfaces of the ceramic body, the external terminal electrode covering the exposed portion of the internal conductor.

The external terminal electrode preferably includes a metal plating film covering the exposed portion of the internal conductor and a copper plating film covering the metal plating film and in contact with the ceramic body, and a copper oxide is present in a discontinuous manner inside the copper plating film at least at the interface between the copper plating film and the ceramic body. As used herein the term "discontinuous" means that the copper oxide is present in the copper plating film in a non-uniform arrangement and/or the copper oxide is present in some portions of the copper plating film but not present in other portions of the copper plating film.

Preferably, in the multilayer ceramic electronic component, the copper oxide is also in contact with the first main surface and the second main surface of the ceramic body.

Preferably, the external terminal electrode further includes auxiliary conductive layers disposed on the first main surface and the second main surface of the ceramic body, the copper oxide is disposed between the metal plating film and the auxiliary conductive layers, and the copper plating film covers the metal plating film, the copper oxide, and the auxiliary conductive layers.

The internal conductor preferably includes Ni and the metal plating film preferably includes Ni, for example.

The copper oxide described above is often in the form of beads.

The copper oxide may preferably include $Cu_2O$ and $CuO$, for example. In such a case, $Cu_2O$ preferably accounts for at least about 90 percent by weight of the copper oxide, for example.

Another preferred embodiment of the present invention provides a method for making the multilayer ceramic electronic component described above.

The method includes a step of preparing a ceramic body having a first main surface and a second main surface that faces the first main surface and a plurality of side surfaces that connect the first main surface to the second main surface, the ceramic body including a plurality of stacked ceramic layers and an internal conductor inside the ceramic body, the internal conductor having an exposed portion exposed at least one of the side surfaces of the ceramic body, a step of subjecting the ceramic body to plating treatment to deposit a metal plating film on the exposed portion of the internal conductor, a step of subjecting the ceramic body to plating treatment to deposit a copper plating film that covers the metal plating film and makes contact with the side surfaces of the ceramic body around the metal plating film, and a step of heat-treating the ceramic body to generate a copper liquid phase, an oxygen liquid phase, and a copper solid phase between the copper plating film and the ceramic body.

According to various preferred embodiments of the present invention, the external terminal electrode is formed by steps of depositing a metal plating film, depositing a copper plating film that covers the metal plating film and makes contact with the side surfaces of the ceramic body around the metal plating film, and heat-treating the ceramic body under desired conditions. As a result, the copper liquid phase, the oxygen liquid phase, and the copper solid phase are generated between the copper plating film and the ceramic body. The resulting mixed phase tends to segregate inside the copper plating film at least at the interface between the copper plating film and the ceramic body. When cooled, the copper liquid phase and the oxygen liquid phase solidify, thereby producing copper oxides. The copper oxides are present in a discontinuous manner inside the copper plating film at least at the interface between the copper plating film and the ceramic body.

The copper oxides function as an adhesive to securely join the ceramic body to the copper plating film. The bonding force of the external terminal electrode including the copper plating film to the ceramic body can preferably be increased, and, as a result, a multilayer ceramic electronic component having an external terminal electrode with good bonding force to the ceramic body can be obtained.

The metal plating film functions as a barrier layer to suppress interdiffusion of the copper included in the copper plating film and the metal included in the internal conductor. Thus, degradation of the continuity of the copper plating film caused by the interdiffusion can be effectively prevented.

Since the metal plating film and the copper plating film defining the external terminal electrode are formed by plating, the films can be made thin and flat as compared to when they are made from a conductive paste. Thus, size reduction of the multilayer ceramic electronic component can be achieved and the volume of the ceramic body can be increased within a predetermined size standard. Thus, the performance of the multilayer ceramic electronic component can be improved. In particular, when preferred embodiments of the present invention are applied to a multilayer ceramic capacitor, the capacitance can be increased within the predetermined size standard.

In the multilayer ceramic electronic component described above, the bonding force of the external terminal electrode to the ceramic body can be further increased when the copper oxide also contacts the first and second main surfaces of the ceramic body.

When the external terminal electrode further includes auxiliary conductive layers disposed on the first and second main surfaces of the ceramic body, growth of the copper plating film on the first and the second main surfaces can be accelerated, and formation of the copper oxides on the first and second main surfaces can be facilitated.

When the internal conductor includes Ni and the metal plating film includes Ni, a strong connection can be provided between the internal conductor and the metal plating film. This also increases the bonding force of the external terminal electrode to the ceramic body.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 9A and 9B are plan views at two sections showing the internal structure of a ceramic body of the multilayer ceramic electronic component shown in FIG. 8.

DETAILED DESCRIPTION OF PREFERRED EMBODIMENTS

Figure 1:
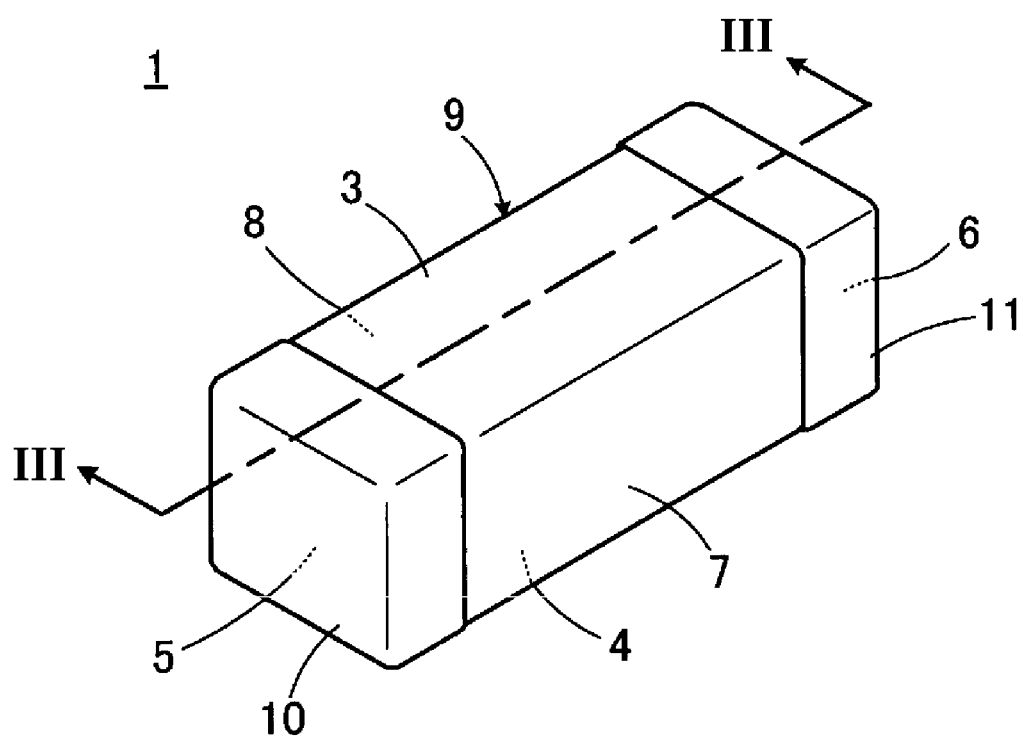
FIG. 1 is a perspective view of a multilayer ceramic electronic component according to a first preferred embodiment of the present invention.
Figure 2A:
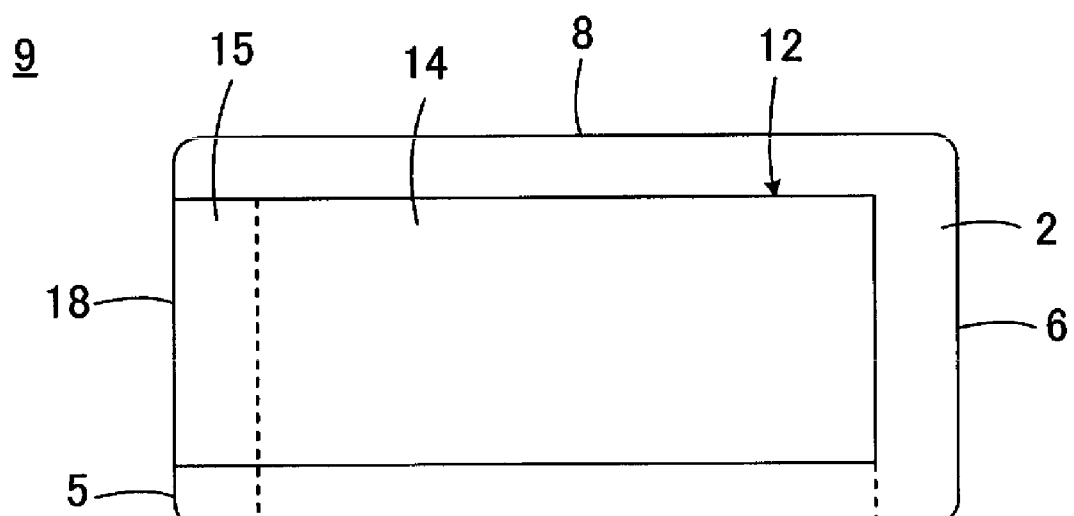
FIGS. 2A and 2B are plan views at two sections showing the internal structure of the multilayer ceramic electronic component shown in FIG. 1.
Figure 2B:
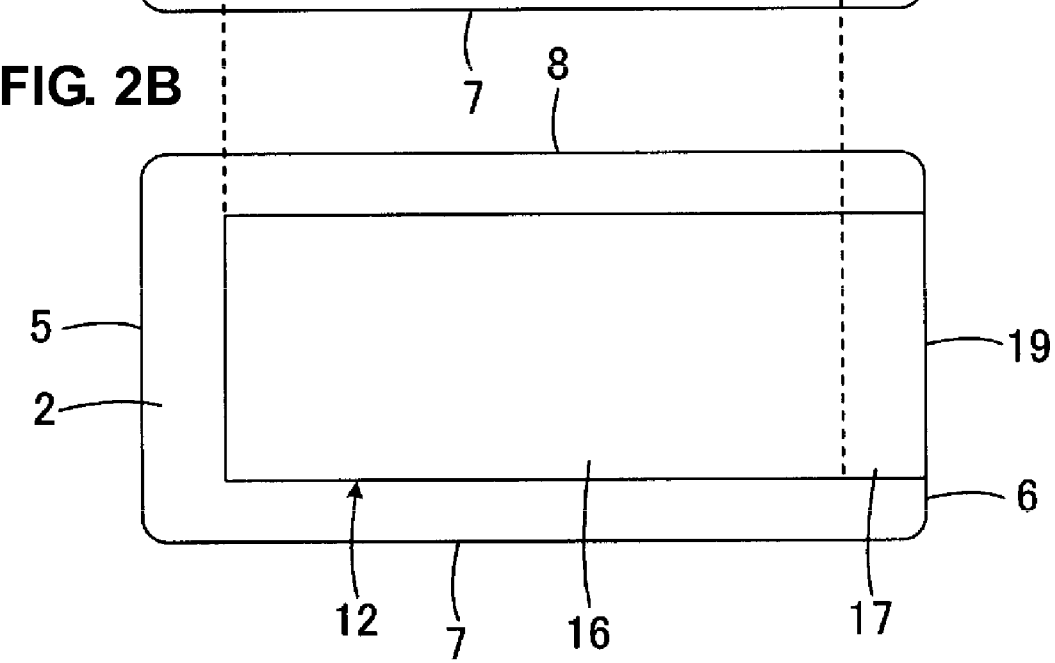
Figure 3:
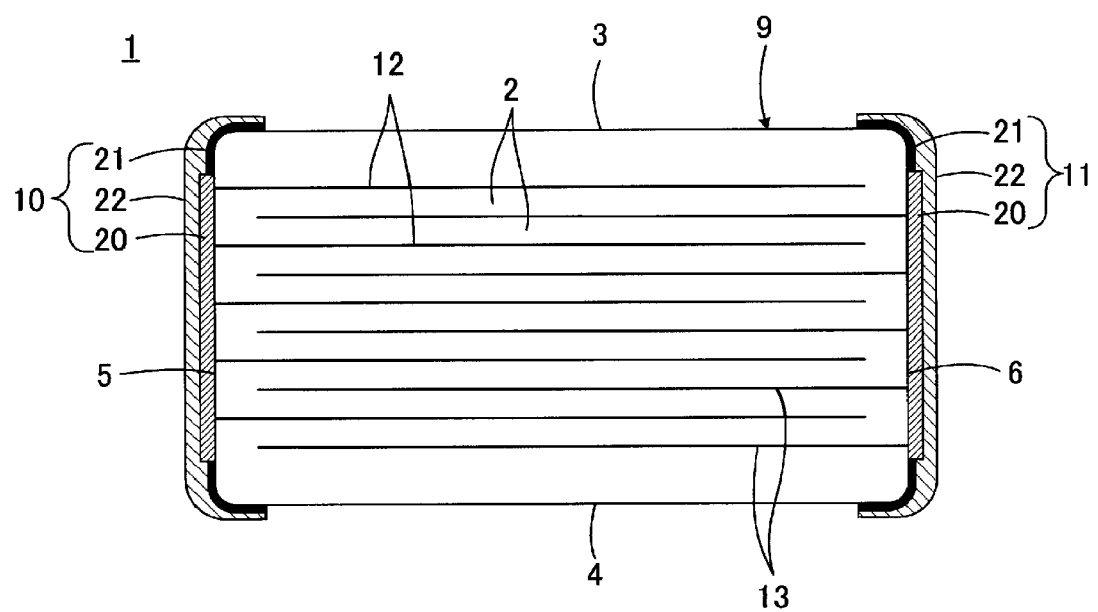
FIG. 3 is a cross-sectional view taken along line III-III in FIG. 1.
Figure 4:
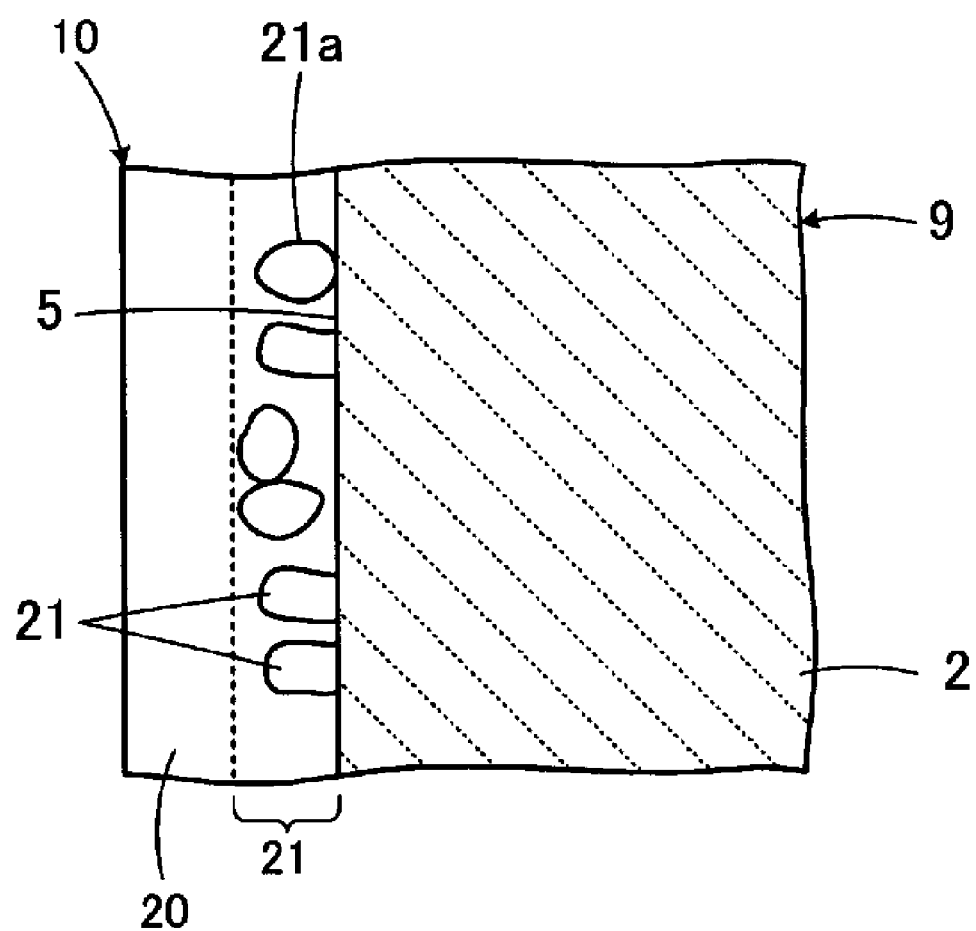
FIG. 4 is an enlarged cross-sectional view of a portion of FIG. 3.

FIGS. 1 to 4 illustrate a first preferred embodiment of the present invention. FIG. 1 is a perspective view showing a multilayer ceramic electronic component 1. FIGS. 2A and 2B are plan views at two sections showing the internal structure of the multilayer ceramic electronic component 1 shown in FIG. 1. FIG. 3 is a cross-sectional view taken along line III-III in FIG. 1. FIG. 4 is an enlarged cross-sectional view showing a portion of FIG. 3.

As shown in FIGS. 1 to 3, the multilayer ceramic electronic component 1 includes a ceramic body 9 defined by a plurality of stacked ceramic layers 2. The ceramic body 9 has a first main surface 3 and a second main surface 4 that faces the first main surface 3, and first to fourth side surfaces 5 to 8 that connect the first main surface 3 to the second main surface 4. The first side surface 5 faces the second side surface 6, and the third side surface 7 faces the fourth side surface 8.

A first external terminal electrode 10 is disposed on the first side surface 5, and a second external terminal electrode 11 is disposed on the second side surface 6. Each of the first external terminal electrode 10 and the second external terminal electrode 11 has portions that overlap the first main surface 3, the second main surface 4, the third side surface 7, and the fourth side surface 8. The first external terminal electrode 10 and the second external terminal electrode 11 are electrically isolated from each other.

First and second internal conductors 12 and 13 are disposed in the ceramic body 9. Where a plurality of first internal conductors 12 and a plurality of second internal conductors 13 are provided, the first internal conductors 12 and the second internal conductors 13 are alternately arranged in the stacking direction while being separated by the ceramic layers 2. The first internal conductors 12 extend to the first side surface 5 and are electrically connected to the first external terminal electrode 10. The second internal conductors 13 extend to the second side surface 6 and are electrically connected to the second external terminal electrode 11.

As illustrated in FIG. 2A, each first internal conductor 12 has an effective portion 14 and an extended portion 15 that extends from the effective portion 14 to the first side surface 5. As illustrated in FIG. 2B, each second internal conductor 13 has an effective portion 16 that faces the effective portion 14 of the first internal conductor 12 and an extended portion 17 that extends from the effective portion 16 to the second side surface 6. A first exposed portion 18 exposed at the first side surface 5 is located at one end of the extended portion 15 of the first internal conductor 12. The first exposed portion 18 defines a connecting portion that is connected to the first external terminal electrode 10. A second exposed portion 19 exposed at the second side surface 6 is located at one end of the extended portion 17 of the second internal conductor 13. The second exposed portion 19 defines a connecting portion that connects to the second external terminal electrode 11.

An electrical characteristic is exhibited in the portion where the effective portion 14 of the first internal conductor 12 and the effective portion 16 of the second internal conductor 13 face each other with the ceramic layer 2 therebetween.

As shown in FIG. 3, the first external terminal electrode 10 includes a metal plating film 20 covering the first exposed portions 18 of the first internal conductors 12 and a Cu plating film 22 covering the metal plating film 20. The Cu plating film 22 is in contact with the first side surface 5, the first main surface 3, and the second main surface 4. A Cu oxide-containing region 21 is disposed at least at the interface between the Cu plating film 22 and the ceramic body 9 and inside the Cu plating film 22. The Cu oxide-containing region 21 is the region at which a Cu oxide is present in a discontinuous manner. The details of the Cu oxide-containing region 21 will be described below with reference to FIG. 4.

As with the first external terminal electrode 10, the second external terminal electrode 11 includes a metal plating film 20, a Cu oxide-containing region 21, and a Cu plating film 22.

The metal plating films 20 function as barrier layers to prevent interdiffusion of copper included in the Cu plating films 22 and the metal included in the first and second internal conductors 12 and 13 and to suppress degradation of the continuity of the Cu plating films 22 caused by the interdiffusion. The thickness of each metal plating film 20 is preferably about 3 µm to about 7 µm, for example. When the thickness of the metal plating film 20 is less than about 3 µm, voids may be formed inside the metal plating film 20. At a thickness exceeding about 7 µm, the thickness of the first external terminal electrode 10 and the second external terminal electrode 11 may become excessively large, although this depends on the desired thickness. The metal plating film 20 is preferably composed of at least one metal selected from the group consisting of Ni, Sn, Pb, Au, Ag, Pd, Bi, and Zn or an alloy including the at least one metal, for example.

FIG. 4 shows a portion of FIG. 3, i.e., a portion of the Cu plating film 22 of the first external terminal electrode 10 at which the Cu oxide-containing region 21 is formed. Although not shown in the drawing, the Cu plating film 22 of the second external terminal electrodes 11 preferably has the same or substantially the same structure.

As shown in FIG. 4, the Cu oxide-containing region 21 at which a Cu oxide 21a is present in a discontinuous manner is formed at least at the interface between the Cu plating film 22 and the ceramic body 9 and inside the Cu plating film 22 of the first external terminal electrode 10. FIG. 4 shows one example of a discontinuous state where the Cu oxide 21a is present in the form of beads. However, the Cu oxide 21a need not be in such an independent state and may be in the form of strips, for example. The Cu oxide 21a securely attaches the first external terminal electrode 10 to the ceramic body 9. This function is described in detail below. The Cu oxide 21a may preferably include $Cu_2O$ and $CuO$, for example. $Cu_2O$ preferably accounts for at least about 90 percent by weight, for example, of the Cu oxide 21a.

The thickness of each Cu plating film 22 is preferably about 1 µm to about 10 µm, for example. Where the Cu plating film 22 is exposed as the outermost layer, the surface of the Cu plating film 22 may preferably be subjected to antirust treatment.

The ceramic layer 2 is composed of a dielectric ceramic primarily including, for example, $BaTiO_3$, $CaTiO_3$, $SrTiO_3$, or $CaZrO_3$. An auxiliary component such as a Mn compound, an Fe compound, a Cr compound, a Co compound, a Ni compound, for example, may preferably be added to the main component. Other examples of the ceramic that defines the ceramic layer 2 include piezoelectric ceramics such as PZT ceramics and semiconductor ceramics such as spinel ceramics. Where a dielectric ceramic is used, the multilayer ceramic electronic component 1 functions as a capacitor. Where a piezoelectric ceramic is used, the multilayer ceramic electronic component 1 functions as a piezoelectric component. Where a semiconductor ceramic is used, the multilayer ceramic electronic component 1 functions as a thermistor. The thickness of the ceramic layer 2 is preferably about 0.5 µm to about 10 µm after firing, for example.

The conductive component included in the internal conductors 12 and 13 may be, for example, Ni, Cu, Ag, Pd, or Au, or an alloy containing the foregoing. When the metal plating film 20 is composed of Ni, the internal conductors 12 and 13 preferably include Ni. The thickness of each of the internal conductors 12 and 13 after firing is preferably about 0.5 µm to about 2.0 µm, for example.

One example of a method for making the multilayer ceramic electronic component 1 described above will now be described.

First, ceramic green sheets that define the ceramic layers 2 and a conductive paste that define the internal conductors 12 and 13 are prepared. The ceramic green sheets and the conductive paste preferably include binders and solvents which may be organic binders and organic solvents known in the art, for example.

Next, the conductive paste is printed on the ceramic green sheets by, for example, screen-printing to form predetermined patterns. As a result, ceramic green sheets with internal conductor patterns that form the internal conductors 12 and 13 are obtained.

A predetermined number of the ceramic green sheets with the internal conductor patterns are stacked in a predetermined order and then a predetermined number of outer layer ceramic green sheets that do not include any conductive paste printed thereon are stacked on the top and the bottom of the stack of the ceramic green sheets with the internal conductor patterns to obtain a green mother compact. The green mother compact is press-bonded in the stacking direction by hydrostatic pressing, for example, if necessary.

The green mother compact is cut to a predetermined size. As a result, the ceramic body 9 in a green state is obtained.

The green ceramic body 9 is then fired. The firing temperature is preferably selected from the range of, for example, about 900° C. to about 1300° C., although the temperature depends on the ceramic materials included in the ceramic green sheets or the metal materials included in the conductive paste films.

Next, polishing, such as barrel polishing, for example, is performed as required to expose the exposed portions 18 and 19 of the internal conductors 12 and 13. At the same time, the edges and corners of the ceramic body 9 are rounded. If necessary, a water repellent finish is formed to prevent entry of a plating solution in the gaps between the ceramic layers 2 and the exposed portions 18 and 19 of the internal conductors 12 and 13.

A first plating treatment is performed on the ceramic body 9 to deposit metal plating films 20 that cover the exposed portions 18 and 19 of the first and second internal conductors 12 and 13.

Then, a second plating treatment is performed to deposit Cu plating films 22 that cover the metal plating films 20 and contact the first side surface 5 and the second side surface 6 of the ceramic body 9 around the metal plating films 20. The Cu plating films 22 may be deposited so as to include portions that overlap the third side surface 7, the fourth side surface 8, the first main surface 3, and the second main surface 4.

Next, the ceramic body 9 is heat-treated to generate a Cu liquid phase, an O liquid phase, and a Cu solid phase between the Cu plating films 20 and the outer surfaces of the ceramic layer 9. These mixed phases tend to segregate in the interfaces between the Cu plating films 20 and the outer surfaces of the ceramic body 9. This is presumably because the liquid phases tend to migrate toward microgaps between the Cu plating films 20 and the outer surfaces of the ceramic body 9 or micropores in the surfaces of the ceramic body 9 during heat treatment.

The heat treatment conditions preferably include a temperature of at least about 1065° C. and an oxygen concentration of at least about 50 ppm, for example. If the temperature is less than about 1065° C. or the oxygen concentration is less than about 50 ppm, the Cu liquid phase and the O liquid phase may not be satisfactorily produced. The upper limit of the heat-treatment temperature is preferably not greater than the melting point of Cu, in particular, less than about 1084° C. The ceramic body 9 is then cooled to room temperature. As the ceramic body 9 is cooled, the Cu liquid phase and the O liquid phase segregated in the interfaces solidify and form the Cu oxide 21a at the interfaces. The Cu oxide 21a securely attaches the Cu plating films 22 to the ceramic body 9. In particular, a stronger attached state is achieved between $Cu_2O$ and the ceramic. Since the gaps between the Cu plating films 22 and the ceramic body 9 are sealed with the Cu oxide 21a, entry of water from outside is suppressed and the reliability of the multilayer ceramic capacitor 1 is improved.

The plating treatment described above may preferably be electrolytic or electroless, for example. Where electroless plating is used, a preliminary process using a catalyst is required to improve the plating rate, and thus, the process is relatively complicated. Therefore, electrolytic plating is preferred. In order to accelerate formation of the plating films, strike plating is preferably performed prior to electrolytic plating or electroless plating. Barrel plating is preferably used during the plating treatment.

Figure 5:
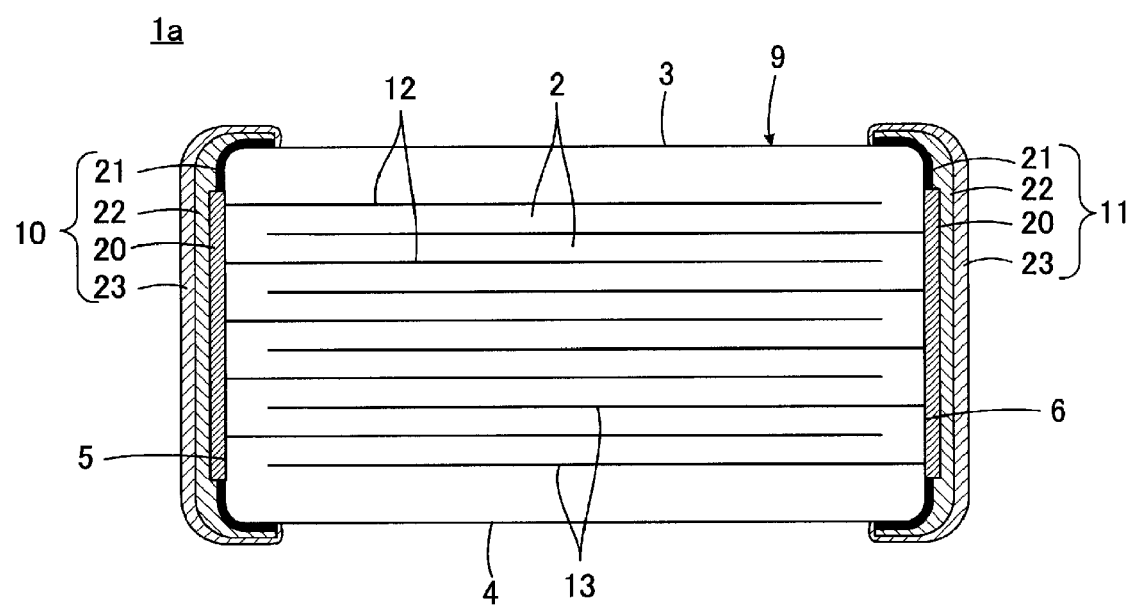
FIG. 5 illustrates a second preferred embodiment of the present invention and corresponds to FIG. 3.

FIG. 5 illustrates a second preferred embodiment of the present invention and corresponds to FIG. 3. In FIG. 5, the elements equivalent to those shown in FIG. 3 are represented by the same reference symbols and the description therefor is omitted to avoid redundancy.

Referring to FIG. 5, in a multilayer ceramic electronic component 1a according to the second preferred embodiment, upper layer plating films 23 are respectively disposed on the Cu plating films 22 of the first external terminal electrode 10 and the second external terminal electrode 11. Each upper layer plating film 23 is preferably composed of, for example, at least one metal selected from the group consisting of Cu, Ni, Sn, Pb, Au, Ag, Pd, Bi, and Zn or an alloy including the at least one metal.

The upper layer plating film 23 may include a plurality of layers. For example, the upper layer plating film 23 preferably includes a first layer, i.e., an underlayer, composed of Ni having a solder barrier property and a second layer, i.e., the outer layer, composed of Sn or Au having good solder wettability. The thickness of each layer of the upper layer plating film 23 is preferably about 1 μm to about 15 μm, for example.

The plating process for forming the upper layer plating films 23 is preferably performed after the heat treatment used to generate the Cu liquid phase, the O liquid phase, and the Cu solid phase described above. This is because the effect of suppressing entry of the plating solution is provided by the formation of the Cu oxide-containing regions 21 where the Cu oxide is present in a discontinuous manner, and thus, the reliability of the multilayer ceramic electronic component 1a can be improved.

Figure 6:
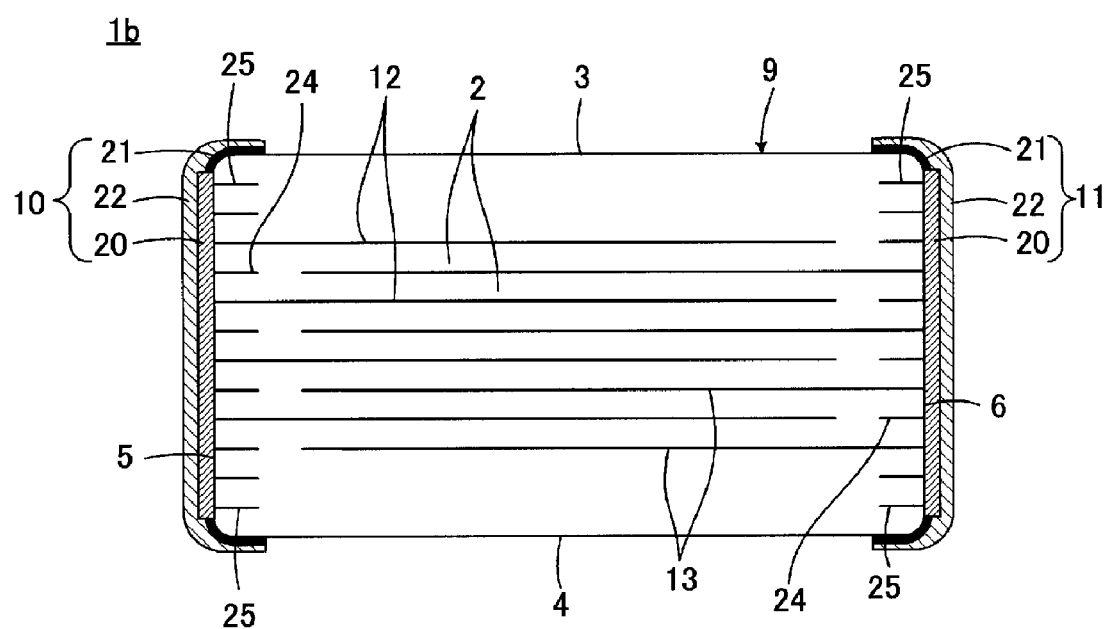
FIG. 6 illustrates a third preferred embodiment of the present invention and corresponds to FIG. 3.

FIG. 6 illustrates a third preferred embodiment of the present invention and corresponds to FIG. 3. In FIG. 6, the elements equivalent to those shown in FIG. 3 are represented by the same reference symbols and the description therefor is omitted to avoid redundancy.

Referring to FIG. 6, in a multilayer ceramic electronic component 1b of the third preferred embodiment, dummy internal conductors 24 and 25 that do not substantially contribute to the electrical characteristics are provided in the ceramic body 9. In this preferred embodiment, the dummy internal conductors 24 and 25 preferably include inner layer dummy internal conductors 24 that are disposed on the same planes as the first internal conductors 12 and the second internal conductors 13 and outer layer dummy internal conductors 25 that are not disposed on the same planes as the first internal conductors 12 and the second internal conductors 13.

As with the first internal conductors 12 and the second internal conductors 13, the dummy internal conductors 24 and 25 have exposed portions at the first side surface 5 and the second side surface 6 of the ceramic body 9. The exposed portions are also covered with the first external terminal electrode 10 and the second external terminal electrode 11 and are connected to the metal plating films 20. Thus, the bonding force of the first external terminal electrode 10 and the second external terminal electrode 11 to the ceramic body 9 can be further improved. The dummy internal conductors 24 and 25 preferably include the same metal as the first internal conductor 12 and the second internal conductor 13.

Figure 7:
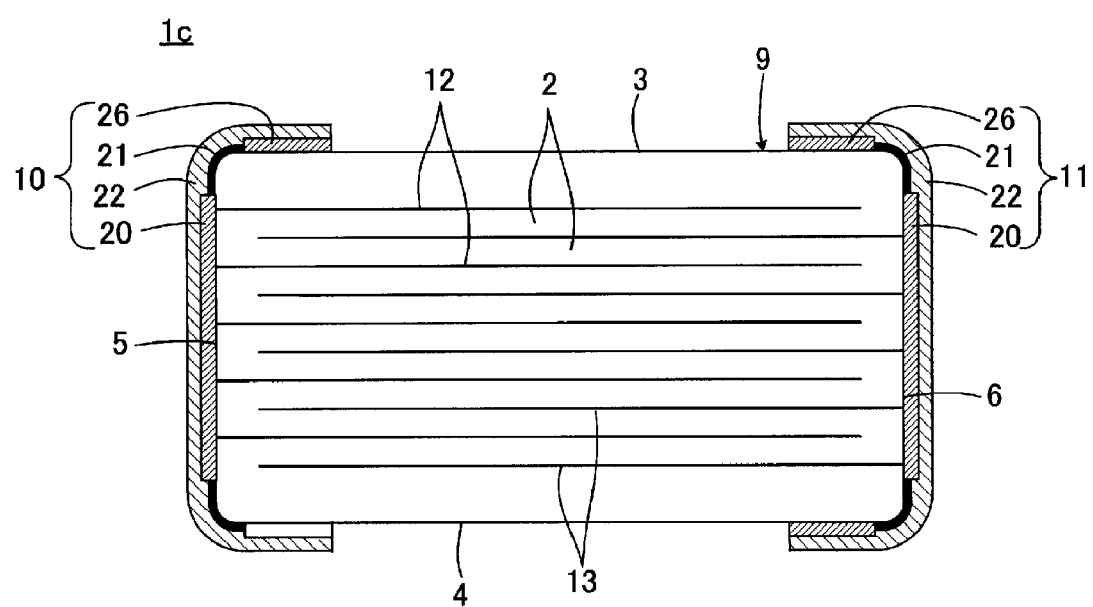
FIG. 7 illustrates a fourth preferred embodiment of the present invention and corresponds to FIG. 3.

FIG. 7 illustrates a fourth preferred embodiment of the present invention and corresponds to FIG. 3. In FIG. 7, the elements equivalent to those shown in FIG. 3 are represented by the same reference symbols and the description therefor is omitted to avoid redundancy.

In a multilayer ceramic electronic component 1c of the fourth preferred embodiment, each of the first external terminal electrode 10 and the second external terminal electrode 11 further includes auxiliary conductive layers 26 that are disposed on the first main surface 3 and the second main surface 4. As a result, the Cu oxide-containing region 21 is provided between the metal plating film 20 and the auxiliary conductive layer 26, and the Cu plating film 22 covers the metal plating film 20, the Cu oxide-containing region 21, and the auxiliary conductive layer 26.

The auxiliary conductive layers 26 accelerate growth of Cu plating films 22 on the first main surface 3 and the second main surface 4 and facilitate the formation of the Cu oxide-containing regions 21 on the first main surface 3 and the second main surface 4.

The auxiliary conductive layers 26 are preferably composed of at least one metal selected from the group consisting of Ni, Sn, Pb, Au, Ag, Pd, Bi, and Zn or an alloy including the at least one metal, for example. Moreover, the auxiliary conductive layers 26 may include a glass component.

The auxiliary conductive layers 26 may be formed by stacking ceramic green sheets, on which conductor pattern films that define the auxiliary conductive layers 26 are formed in advance, on the top and the bottom of the ceramic body 9 in a green state, and co-firing the ceramic green sheets and the ceramic body 9 in a green state. Alternatively, the auxiliary conductive layers 26 may be formed by baking a conductive paste applied on the first main surface 3 and the second main surface 4 of the ceramic body 9 by printing.

Figure 8:
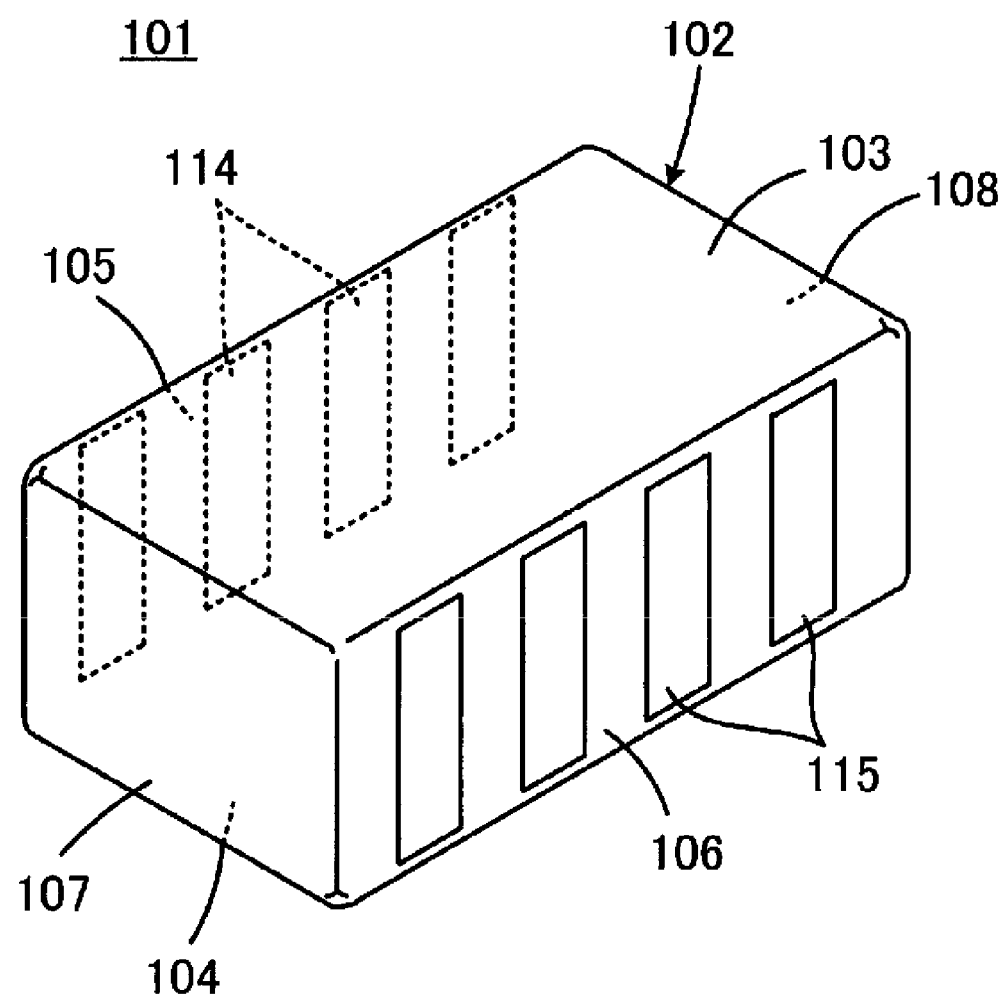
FIG. 8 is a perspective view of a multilayer ceramic electronic component according to a fifth preferred embodiment of the present invention.

FIGS. 8 to 9B illustrate a multilayer ceramic electronic component 101 according to a fifth preferred embodiment of the present invention. FIG. 8 is a perspective view showing the multilayer ceramic electronic component 101.

The multilayer ceramic electronic component 101 defines a multilayer ceramic capacitor array and includes a ceramic body 102. The ceramic body 102 has a first main surface 103 and a second main surface 104 that faces the first main surface 103, and a first side surface 105, a second side surface 106, a third side surface 107, and a fourth side surface 108 that connect the first main surface 103 to the second main surface 104. The ceramic body 102 preferably has a rectangular or substantially rectangular parallelepiped shape, for example.

FIGS. 9A and 9B are plan views at two different sections showing the internal structure of the multilayer ceramic electronic component 102. The ceramic body 102 includes a plurality of stacked ceramic layers 109. In the ceramic body 102, a plurality of sets of first and second internal conductors 110 and 111 are alternately arranged in the stacking direction as well as in the main surface direction while ceramic layers 109 are interposed between the first and second internal conductors 110 and 111. In this preferred embodiment, two first internal conductors 110 and two second internal conductors 111 are alternately arranged in the main surface direction. Each of the first internal conductors 110 has an exposed portion 112 at the first side surface 105, and each of the second internal conductors 111 has an exposed portion 113 at the second side surface 106.

As shown in FIG. 8, four first external terminal electrodes 114 are disposed on the first side surface 105 of the ceramic body 102 and four second external terminal electrodes 115 are disposed on the second side surface 106 of the ceramic body 102. The exposed portions 112 of the first internal conductors 110 are covered with the first external terminal electrodes 114 and are electrically connected to the first external terminal electrodes 114. The exposed portions 113 of the second internal conductors 111 are covered with the second external terminal electrodes 115 and are electrically connected to the second external terminal electrodes 115.

Although not shown in the drawings, the first external terminal electrodes 114 and the second external terminal electrodes 115 of the multilayer ceramic electronic component 101 have the same or substantially the same structures as the first external terminal electrode 10 and the second external terminal electrode 11 described with reference to FIGS. 3 and 5 and are made by the same or substantially the same method.

In a multi terminal-type multilayer ceramic electronic component, such as the multilayer ceramic electronic component 101 of the fifth preferred embodiment, a particular distance must be maintained between the adjacent external terminal electrodes to prevent solder bridging. With the application method using a conductive paste, it is difficult to apply the conductive paste with high accuracy, and thus, a greater distance must be maintained between the exposed internal conductors. However, this prevents size reduction. In contrast, according to preferred embodiments of the present invention, plating is used to directly form the external terminal electrodes. Thus, the distance between the exposed internal conductors can be reduced, and the size of the multilayer ceramic electronic component can be further reduced.

Although eight terminals, i.e., a total of eight rows of the exposed portions 112 and 113 of the internal conductors 110 and 111, are provided in the fifth preferred embodiment, the number of terminals is not limited to this and may preferably be at least four, for example. The number of external terminal electrodes corresponding to the respective rows may also preferably be at least four, for example.

Figure 10:
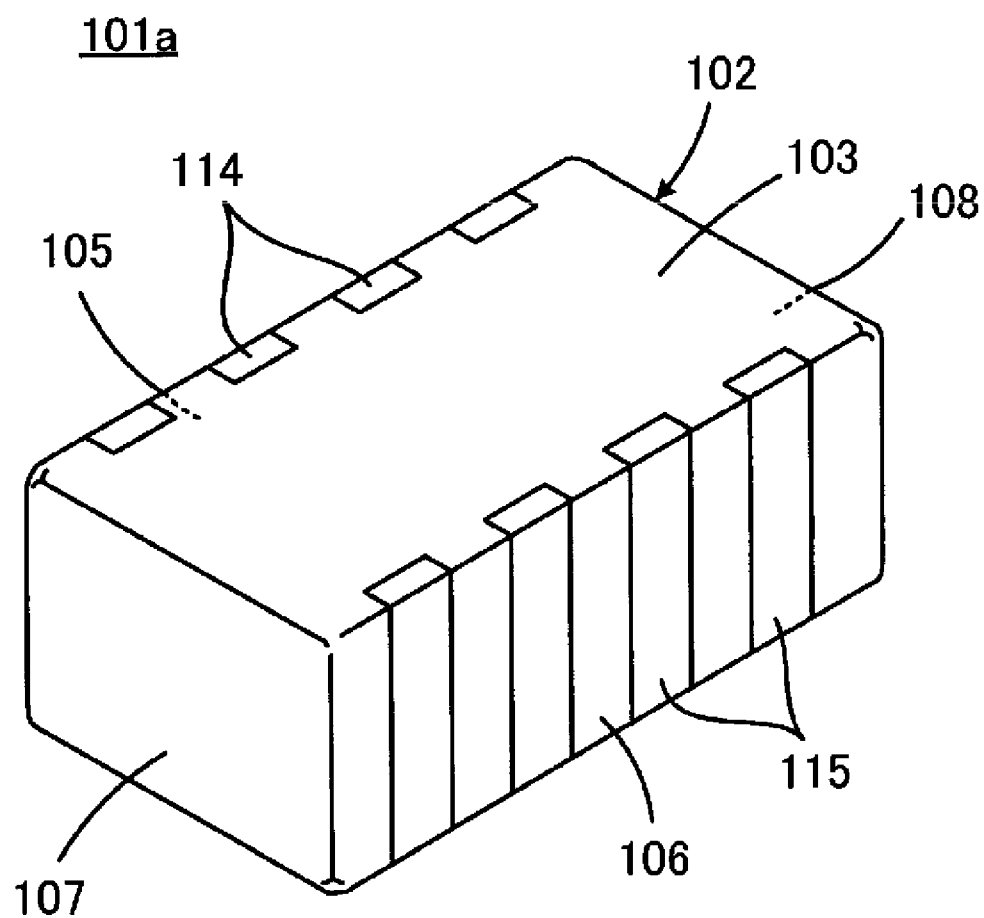
FIG. 10 illustrates a sixth preferred embodiment of the present invention and corresponds to FIG. 8.
Figure 11A:
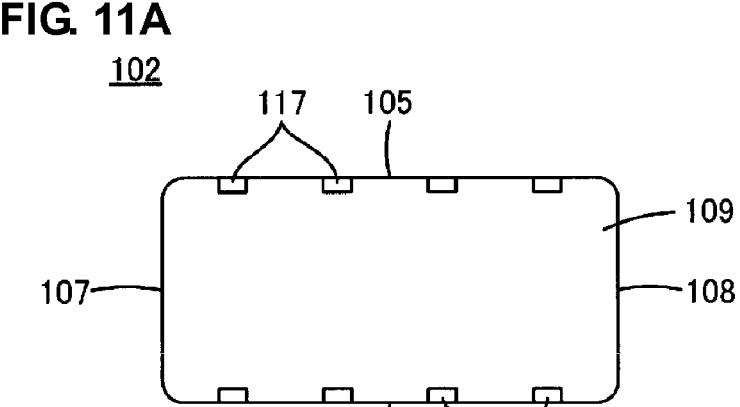
FIGS. 11A to 11D illustrate the sixth preferred embodiment of the present invention and correspond to FIGS. 9A and 9B.
Figure 11B:
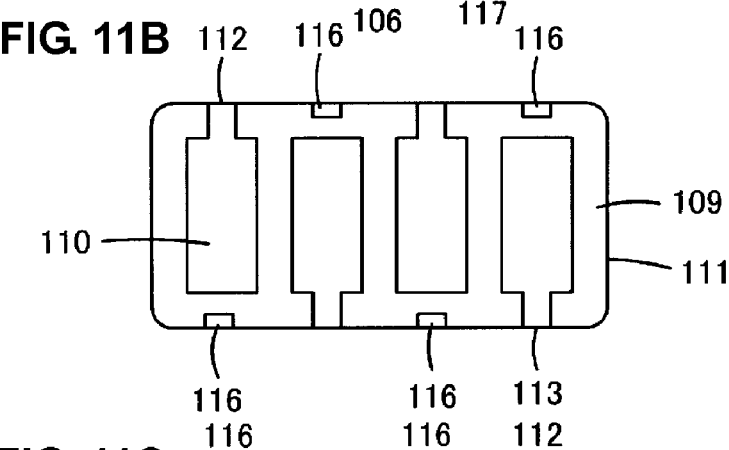
Figure 11C:
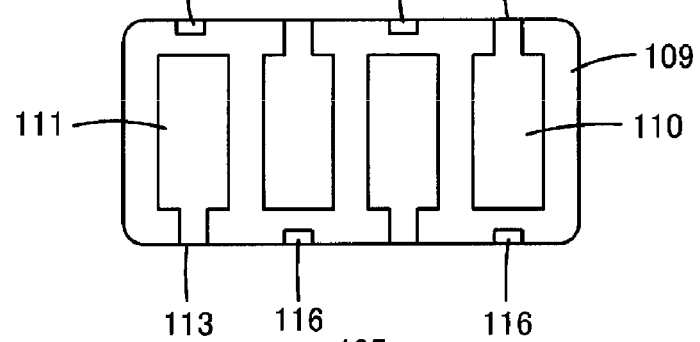
Figure 11D:
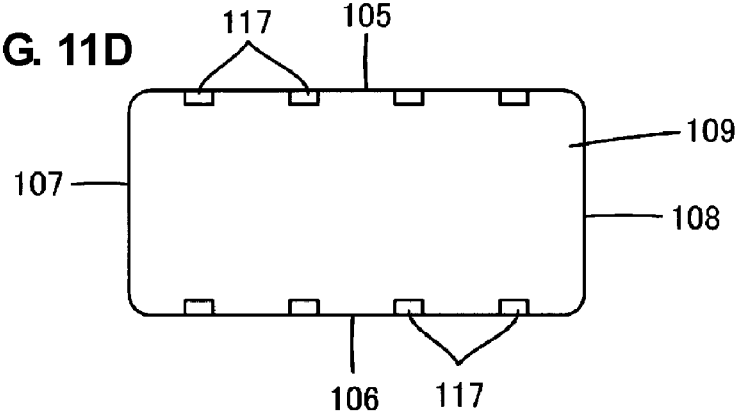
Figure 12A:
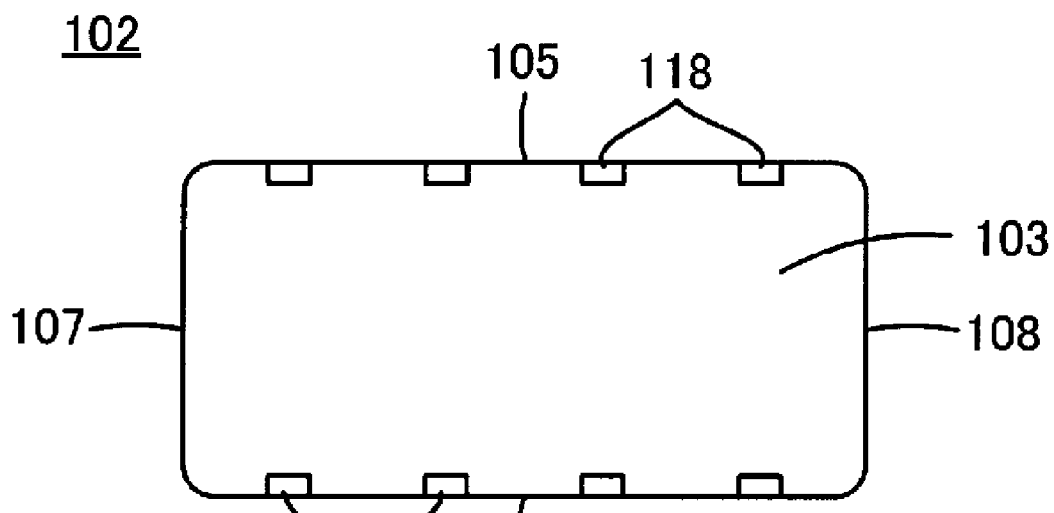
FIGS. 12A and 12B are diagrams illustrating the sixth preferred embodiment of the present invention and respectively show a first main surface and a second main surface of a ceramic body before forming external terminal electrodes.
Figure 12B:
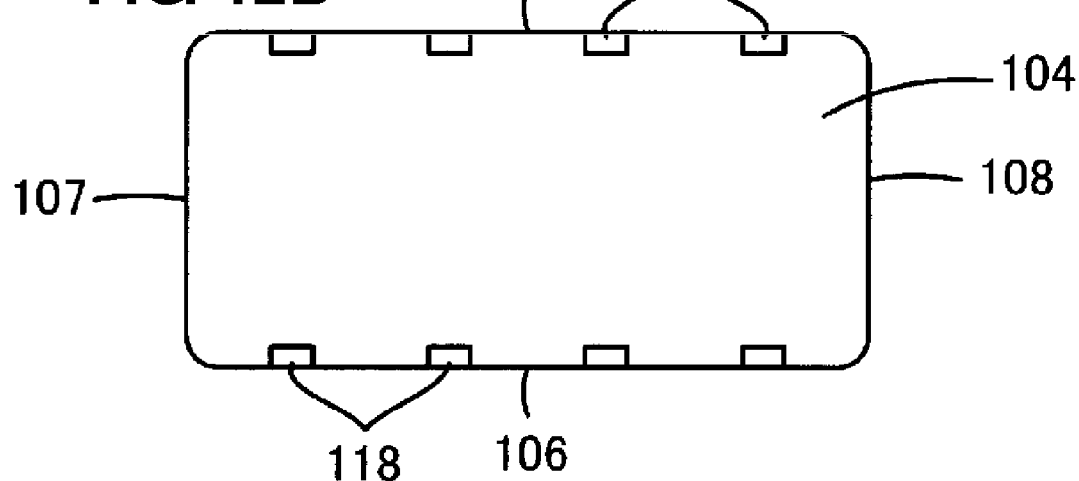

FIGS. 10 to 12B illustrate a multilayer ceramic electronic component 101a of a sixth preferred embodiment of the present invention. FIG. 10 corresponds to FIG. 8, and FIGS. 11A to 11D correspond to FIGS. 9A and 9B. FIG. 12A shows the first main surface 103 of the ceramic body 102 and FIG. 12B shows the second main surface 104 of the ceramic body 102 before the first external terminal electrodes 114 and the second external terminal electrodes 115 are formed. In FIGS. 10 to 12B, the elements equivalent to those shown in FIGS. 8 to 9B are represented by the same reference symbols and the description therefor is omitted to avoid redundancy.

As shown in FIGS. 11A to 11D, according to the sixth preferred embodiment, inner layer dummy internal conductors 116 that are disposed on the same planes as the first internal conductors 110 and the second internal conductors 111 and outer layer dummy internal conductors 117 that are not disposed on the same planes as the first internal conductors 110 and the second internal conductors 111 are provided. As shown in FIGS. 12A and 12B, the external terminal electrodes 114 and 115 include auxiliary conductive layers 118 provided on the first main surface 103 and the second main surface 104 of the ceramic body 102.

The dummy internal conductors 116 and 117 provide substantially the same effects and advantages as the dummy internal conductors 24 and 25 of the third preferred embodiment. The auxiliary conductive layers 118 provide substantially the same effects and advantages as the auxiliary conductive layers 26 of the fourth preferred embodiment. Thus, according to the sixth preferred embodiment, the bonding force of the first external terminal electrodes 114 and the second external terminal electrodes 115 to the ceramic body 102 can be further improved and the regions at which the first external terminal electrodes 114 and the second external terminal electrodes 115 are provided can be easily expanded to extend the first main surface 103 and the second main surface 104.

In the sixth preferred embodiment, the inner layer dummy internal conductors 116 or the outer layer dummy internal conductors 117 may be omitted, or the auxiliary conductive layers 118 may be omitted.

Figure 13:
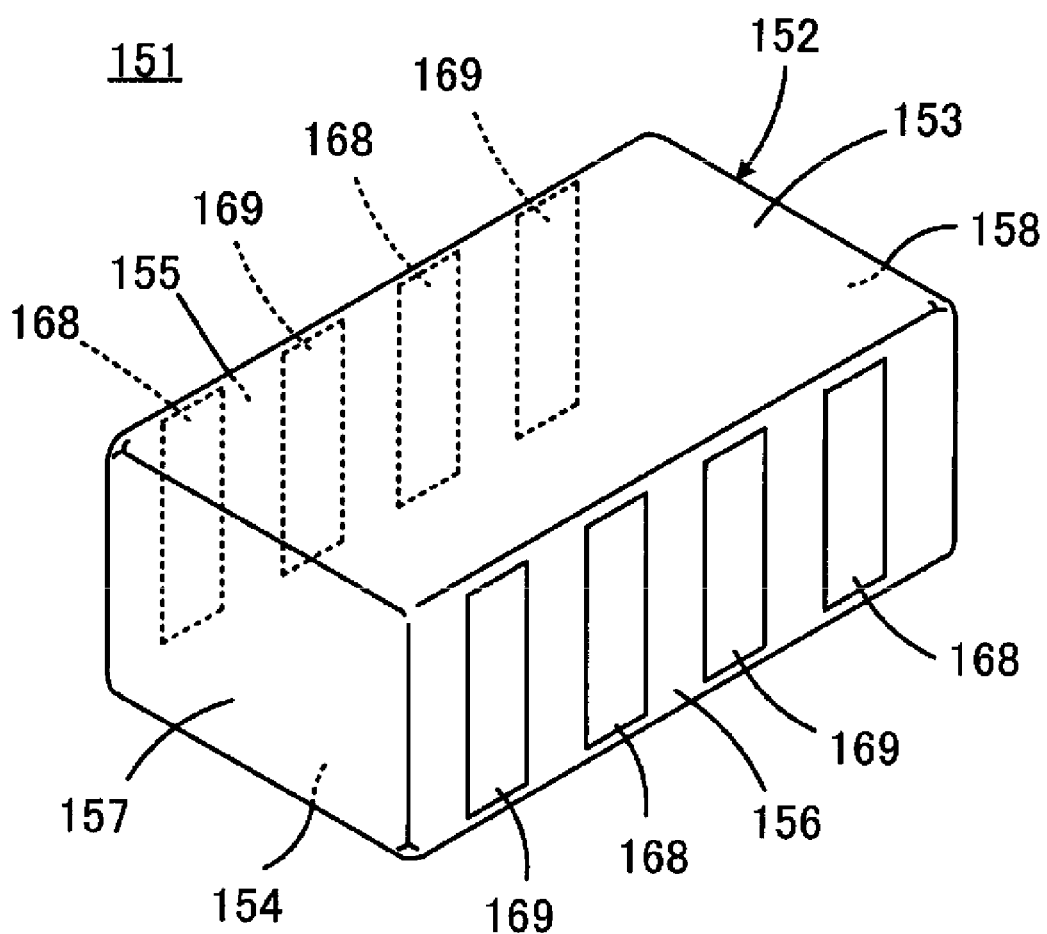
FIG. 13 is a perspective view of a multilayer ceramic electronic component according to a seventh preferred embodiment of the present invention.
Figure 14A:
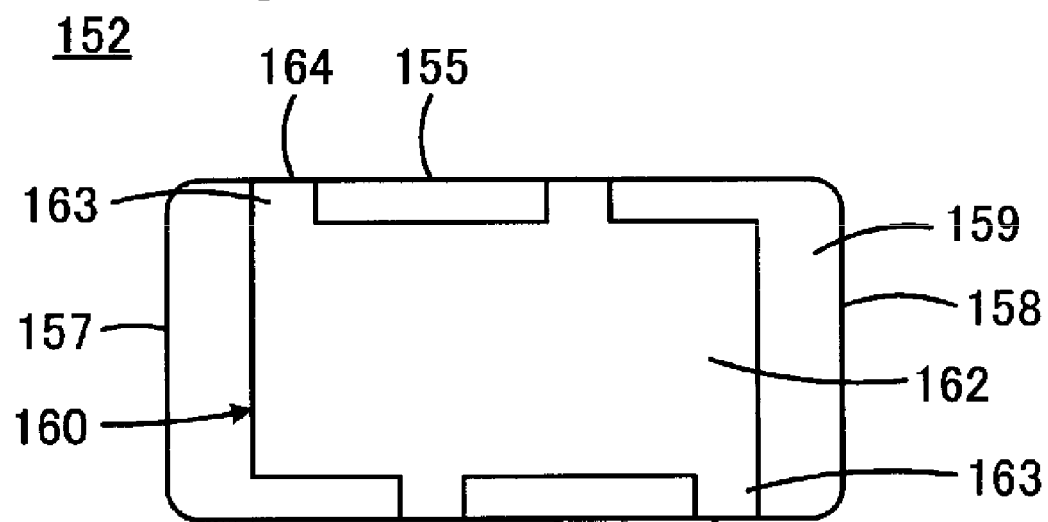
FIGS. 14A and 14B are plan views at two sections showing the internal structure of the multilayer ceramic electronic component shown in FIG. 13.
Figure 14B:
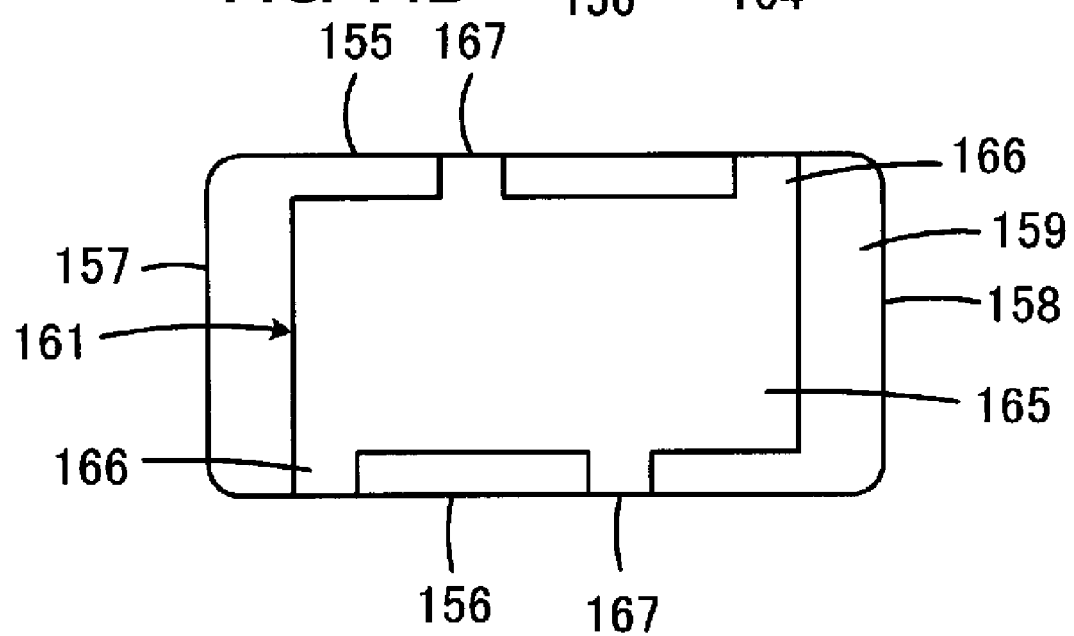

FIGS. 13 to 14B illustrate a multilayer ceramic electronic component 151 according to a seventh preferred embodiment of the present invention. FIG. 13 is a perspective view showing the multilayer ceramic electronic component 151.

The multilayer ceramic electronic component 151 defines a multi terminal-type, low ESL multilayer ceramic capacitor and includes a ceramic body 152. The ceramic body 152 has a first main surface 153 and a second main surface 154 that faces the first main surface 153, and first to fourth side surfaces 155 to 158 that connect the first main surface 153 to the second main surface 154. The ceramic body 152 preferably has a rectangular or substantially rectangular parallelepiped shape, for example.

FIGS. 14A and 14B are plan views at two different sections showing the internal structure of the multilayer ceramic electronic component 152.

The ceramic body 152 includes a plurality of stacked ceramic layers 159. In the ceramic body 152, a plurality of sets of first and second internal conductors 160 and 161 are alternately arranged in the stacking direction while the ceramic layers 159 are interposed between the first and second internal conductors 160 and 161.

Each first internal conductor 160 has a first effective portion 162 that faces the second internal conductor 161, and a plurality of first extended portions 163 extending from the first effective portion 162 to one of the first and second side surfaces 155 and 156. Each first extended portion 163 has an exposed portion 164 exposed at either one of the first and second side surfaces 155 and 156.

Each second internal conductor 161 has a second effective portion 165 that faces the first internal conductor 160, and a plurality of second extended portions 166 extending from the second effective portion 165 to one of the first and second side surfaces 155 and 156. Each second extended portion 166 has an exposed portion 167 exposed at one of the first and second side surfaces 155 and 156.

A plurality of sets of first external terminal electrodes 168 and second external terminal electrodes 169 are alternately arranged on each of the first and second side surfaces 155 and 156 of the ceramic body 152. The exposed portions 164 of the first internal conductors 160 are covered with the first external terminal electrodes 168 and are electrically connected to the first external terminal electrodes 168. The exposed portions 167 of the second internal conductors 161 are covered with the second external terminal electrodes 169 and are electrically connected to the second external terminal electrodes 169.

The structure of and the production method for the external terminal electrodes 10 and 11 described with reference to FIGS. 3 and 5 are also applicable to the first and second external terminal electrodes 168 and 169 of the seventh preferred embodiment.

Figure 15:
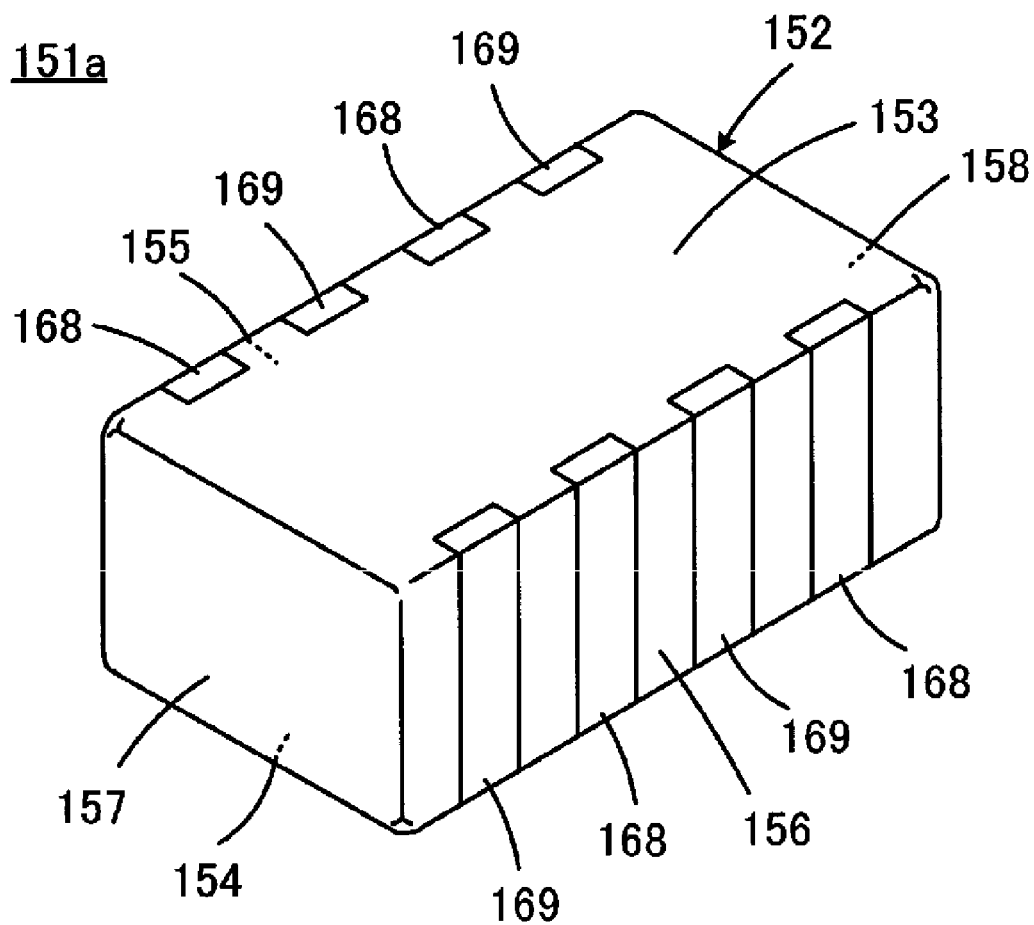
FIG. 15 illustrates an eighth preferred embodiment of the present invention and corresponds to FIG. 13.
Figure 16A:
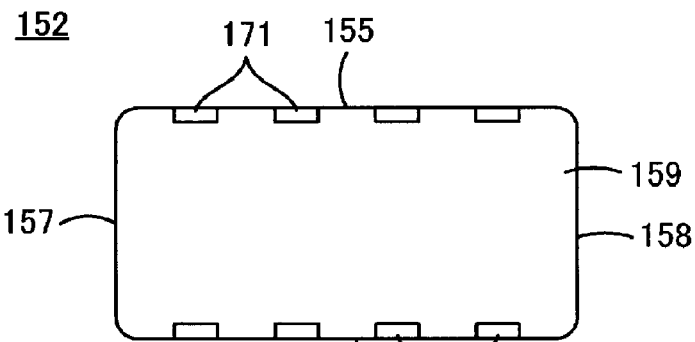
FIGS. 16A to 16D illustrate the eighth preferred embodiment of the present invention and correspond to FIGS. 14A and 14B.
Figure 16B:
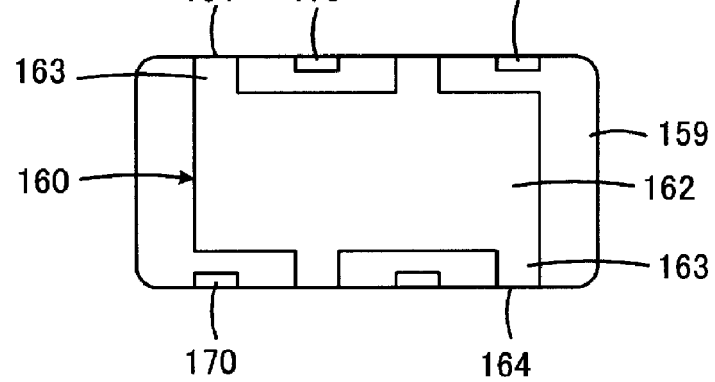
Figure 16C:
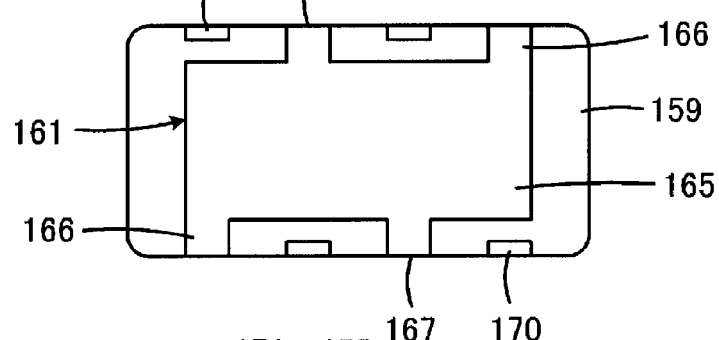
Figure 16D:
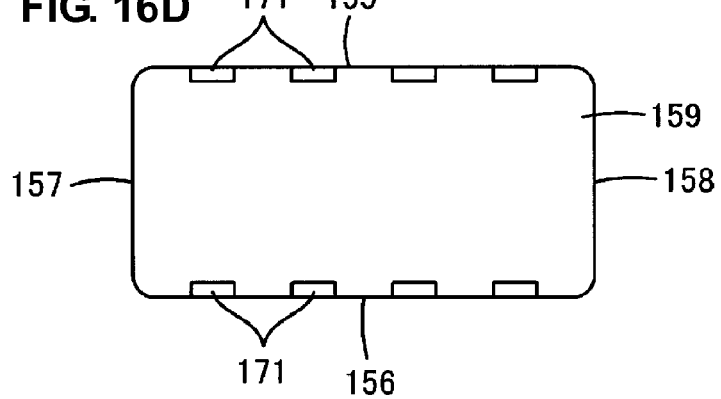
Figure 17A:
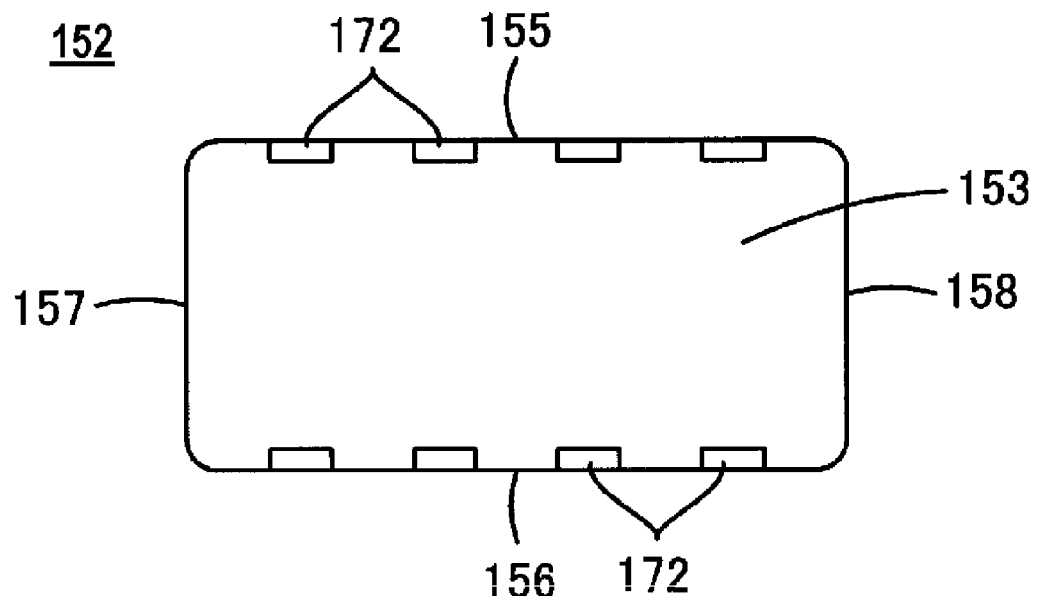
FIGS. 17A and 17B are diagrams illustrating the eighth preferred embodiment of the present invention and respectively show a first main surface and a second main surface of a ceramic body before forming external terminal electrodes.
Figure 17B:
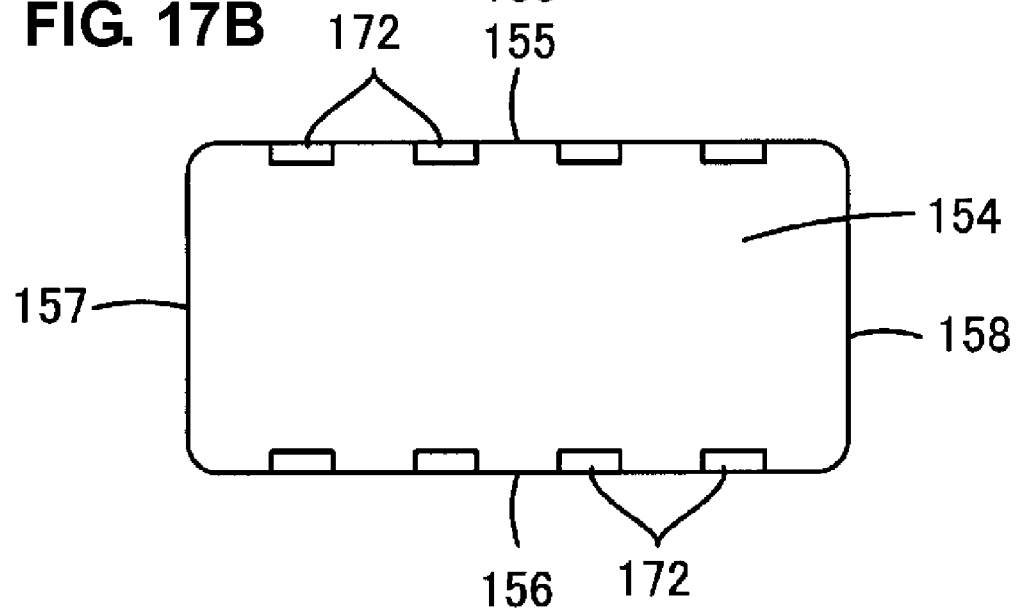

FIGS. 15 to 17B illustrate a multilayer ceramic electronic component 151a according to an eighth preferred embodiment of the present invention. FIG. 15 corresponds to FIG. 13, and FIGS. 16A and 16D correspond to FIGS. 14A and 14B. FIGS. 17A and 17B respectively show the first main surface 153 and the second main surface 154 of the ceramic body 152. In FIGS. 15 to 17B, the elements equivalent to those shown in FIGS. 13 to 14B are represented by the same reference symbols and the description therefor is omitted to avoid redundancy.

The relationship between the eighth preferred embodiment and the seventh preferred embodiment is substantially the same as that between the sixth preferred embodiment and the fifth preferred embodiment. That is, as shown in FIGS. 16A to 16D, according to the eighth preferred embodiment, the inner layer dummy internal conductors 170 that are disposed on the same planes as the first internal conductors 160 and the second internal conductors 161 and the outer layer dummy internal conductors 171 that are not disposed on the same planes as the first internal conductors 160 and the second internal conductors 161 are provided. As shown in FIGS. 17A and 17B, auxiliary conductive layers 172 are also provided on the first main surface 153 and the second main surface 154 of the ceramic body 152.

The dummy internal conductors 170 and 171 provide the substantially same effects and advantages as the dummy internal conductors 24 and 25 of the third preferred embodiment. The auxiliary conductive layers 172 provide substantially the same effects and advantages as the auxiliary conductive layers 26 of the fourth preferred embodiment. Thus, according to the eighth preferred embodiment, the bonding force of the first external terminal electrodes 168 and the second external terminal electrodes 169 to the ceramic body 152 can be further improved and the regions at which the first external terminal electrodes 168 and the second external terminal electrodes 169 are provided can be easily expanded to extend the first main surface 153 and the second main surface 154.

In the eighth preferred embodiment, the inner layer dummy internal conductors 170 or the outer layer dummy internal conductors 171 may be omitted, or the auxiliary conductive layers 172 may be omitted.

Experimental examples to confirm the advantages and effects of preferred embodiments of the present invention will now be described. In the Experimental Examples, multilayer ceramic capacitors of the first preferred embodiment were prepared as the multilayer ceramic electronic components and evaluated.

First, ceramic bodies for multilayer ceramic capacitors having specifications shown in Table 1 below were prepared.

TABLE 1

| | |
|---|---|
| Size | Length: 1.00 mm, width: 0.50 mm, height: 0.50 mm |
| Ceramic layer material | Barium titanate dielectric ceramic |
| Internal conductor metal | Nickel as the main component |
| Number of layers | 220 |
| Rated voltage | 6.3 V |
| Capacitance | 2.2 µF |

Next, external terminal electrodes were formed on each of the ceramic bodies as follows. Nickel plating to form metal plating films, copper plating to form copper plating films, nickel plating to form upper layer plating films, and tin plating to form upper layer plating films were performed in this order while respectively using a nickel plating bath, a copper plating bath, and a tin plating bath shown in Table 2 below under plating conditions shown in Table 3 in a 300 ml horizontally rotating barrel. After a Ni plating film having a thickness of about 3 μm and a Cu plating film having a thickness of about 3 μm on the Ni plating film were sequentially formed, heat treatment was performed at an oxygen concentration of about 50 ppm and a temperature of about 1080° C. Then a Ni plating film having a thickness of about 4 μm and a Sn plating film having a thickness of about 4 μm on the Ni plating film were sequentially formed to obtain a sample of an Example according to a preferred embodiment of the present invention.

Samples of Comparative Example outside the scope of the present invention were prepared by the same or substantially the same process as the Example described above except that the Ni plating to form the metal plating films was omitted and Cu plating films having a thickness of about 8 μm were formed instead by the Cu plating.

TABLE 2

| Ni plating bath |
| --- |
| Watt's bath (weak acidic simple nickel bath)<br>Bath temperature: 60° C.<br>pH: 4.2 |
| Cu plating bath |
| Pyrophosphoric acid bath<br>  14 g/l copper pyrophosphate trihydrate<br>120 g/l potassium pyrophosphate<br>  10 g/l potassium oxalate<br>Bath temperature: 25° C.<br>pH: 8.7 |
| Sn plating bath |
| Sn-235 produced by Dipsol Chemical Co., Ltd.<br>Bath temperature: 33° C.<br>pH: 5.0 |

TABLE 3

| | |
| --- | --- |
| Rotating rate of horizontally rotating barrel | 15 rpm |
| Conductive medium | 0.5 mm (dia) solder balls<br>70 ml<br>(ceramic body volume: 30 ml)<br>Current × time |
| Ni plating for first conductive layer | 10 A × 150 min |
| Cu plating for second and third conductive layers | 10 A × 70 min |
| Ni plating for upper layer plating film | 10 A × 140 min |
| Sn plating for upper layer plating film | 6 A × 90 min |

Figure 18:
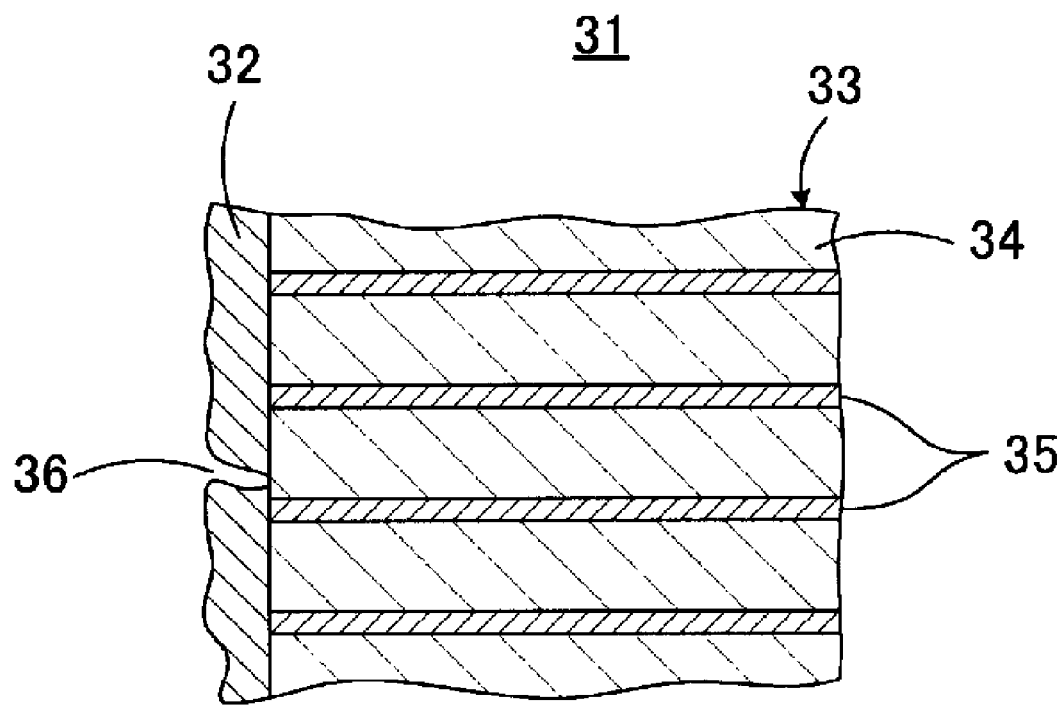
FIG. 18 is an enlarged cross-sectional view schematically showing a void penetrating an external terminal electrode evaluated in Experimental Examples.

Next, samples of the Example and the Comparative Example prepared as described above were analyzed to evaluate the bonding force of the external terminal electrodes to the ceramic bodies. Evaluation was performed by investigating the generation of voids that penetrated the external terminal electrodes and determining how many voids were generated per sample. FIG. 18 is an enlarged view of a portion of a sample of a multilayer ceramic capacitor 31 where an external terminal electrode 32 is formed. The multilayer ceramic capacitor 31 includes a ceramic body 33. The external terminal electrode 32 is electrically connected to a plurality of internal conductors 35 interposed between ceramic layers 34 inside the ceramic body 33. In FIG. 18, a void 36 penetrating the external terminal electrode 32 is schematically illustrated.

For twenty samples of the Example and twenty samples of the Comparative Example, whether voids shown in FIG. 18 were generated and if so, how many voids were generated per sample were investigated. In the Example, no voids were observed whereas an average of about 5.2 voids were found per sample of the Comparative Example.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic electronic component comprising:
a ceramic body including a plurality of stacked ceramic layers, the ceramic body having a first main surface and a second main surface that faces the first main surface and a plurality of side surfaces that connect the first main surface to the second main surface;
an internal conductor disposed in the ceramic body and having an exposed portion exposed at least one of the plurality of side surfaces of the ceramic body; and
an external terminal electrode disposed on at least one of the plurality of side surfaces of the ceramic body, the external terminal electrode covering the exposed portion of the internal conductor; wherein
the external terminal electrode includes a metal plating film covering the exposed portion of the internal conductor and a copper plating film covering the metal plating film and in contact with the ceramic body; and
a copper oxide is present in a discontinuous manner inside the copper plating film at least at an interface between the copper plating film and the ceramic body.

2. The multilayer ceramic electronic component according to claim 1, wherein the copper oxide is in contact with the first main surface and the second main surface of the ceramic body.

3. The multilayer ceramic electronic component according to claim 1, wherein
the external terminal electrode further includes auxiliary conductive layers disposed on the first main surface and the second main surface of the ceramic body;
the copper oxide is present between the metal plating film and the auxiliary conductive layers; and
the copper plating film is arranged to cover the metal plating film, the copper oxide, and the auxiliary conductive layers.

4. The multilayer ceramic electronic component according to claim 1, wherein the internal conductor includes Ni and the metal plating film includes Ni.

5. The multilayer ceramic electronic component according to claim 1, wherein the copper oxide is present in bead form.

6. The multilayer ceramic electronic component according to claim 1, wherein the copper oxide includes $Cu_2O$ and $CuO$.

7. The multilayer ceramic electronic component according to claim 6, wherein the $Cu_2O$ accounts for at least about 90 percent by weight of the copper oxide.

8. A method for making a multilayer ceramic electronic component, the method comprising:
a step of preparing a ceramic body having a first main surface and a second main surface that faces the first main surface and a plurality of side surfaces that connect the first main surface to the second main surface, the ceramic body including a plurality of stacled ceramic layers and an internal conductor inside the ceramic body, the internal conductor having an exposed portion exposed at least one of the plurality of side surfaces of the ceramic body;

a step of subjecting the ceramic body to a plating treatment to deposit a metal plating film on the exposed portion of the internal conductor;

a step of subjecting the ceramic body to a plating treatment to deposit a copper plating film that covers the metal plating film and makes contact with the plurality of side surfaces of the ceramic body around the metal plating film; and a step of heat-treating the ceramic body to generate a copper liquid phase, an oxygen liquid phase, and a copper solid phase between the copper plating film and the ceramic body.

* * * * *